United States Patent [19]

Bennett

[11] Patent Number: 5,046,128
[45] Date of Patent: Sep. 3, 1991

[54] FREQUENCY EQUALIZED SIMULCAST BROADCASTING SYSTEM AND METHOD

[75] Inventor: Richard L. Bennett, Schaumburg, Ill.

[73] Assignee: Motorola, Inc., Schaumburg, Ill.

[21] Appl. No.: 392,496

[22] Filed: Aug. 11, 1989

[51] Int. Cl.[5] ............................................. H04B 7/005
[52] U.S. Cl. ....................................... 455/51; 455/56; 455/119
[58] Field of Search ................... 455/9, 10, 11, 51, 67, 455/38, 52, 103, 116, 119; 340/825.44, 825.48

[56] References Cited

U.S. PATENT DOCUMENTS

| 4,188,582 | 2/1980 | Cannalte et al. | 325/58 |
| 4,255,814 | 3/1981 | Osborne | 455/51 |
| 4,516,269 | 5/1985 | Krinock | 455/35 |
| 4,570,265 | 2/1986 | Thro | 455/52 |
| 4,696,052 | 9/1987 | Breeden | 455/51 |
| 4,701,758 | 10/1987 | Dunkerton et al. | 455/56 |
| 4,850,032 | 7/1989 | Freeburg | 455/51 |

Primary Examiner—Reinhard J. Eisenzopf
Assistant Examiner—Lisa D. Charouel
Attorney, Agent, or Firm—Steven G. Parmelee

[57] ABSTRACT

A simulcast system (100) having remote sites (104) that can transmit a carrier signal (107) having a modulation signal imposed thereon, wherein both the carrier and the modulation signal are derived from the same reference. Monitoring stations (108) receive transmissions from two or more remote sites, and determine the differential, if any, between the frequencies of the recovered modulation signal. The system then acts upon this information to provide correction information to one or more of the remote sites as necessary to ensure substantial carrier frequency similarity between the remote sites.

4 Claims, 2 Drawing Sheets

102

104

FREQUENCY EQUALIZED SIMULCAST BROADCASTING SYSTEM AND METHOD

TECHNICAL FIELD

This invention relates generally to simulcast radio communication systems.

BACKGROUND OF THE INVENTION

Simulcast radio communication systems are typically employed to provide wide area one-way or two-way radio communication services. In such a system, a source site typically originates (or forwards from another originating site) a signal to be generally broadcast. This signal is routed from the source site to a plurality of remote sites. Each remote site then simultaneously broadcasts the signal in coordination with other remote sites to facilitate reception of the signal by receivers within the area covered by the system.

In this way, a receiver outside the operating range of one remote site may still be within the range of one or more other remote sites, thereby reasonably ensuring that the receiver can receive the signal.

One particularly difficult problem with such simulcast systems involves coordinating the various remote sites to ensure that the signals are in fact substantially simultaneously broadcast by each. A failure to accomplish this will result in instances of unacceptable reception coherence, usually as caused by carrier frequency differences between the remote sites, deviation control differences, phase differentials with respect to the modulation signal itself, and the like.

Various efforts to resolve one or more of these problems have been set forth in the prior art. Depending upon the particular application, however, such prior art solutions may not be adequate. A need accordingly exists for a simulcast system that will provide for the substantially simultaneous broadcast of a frequency equalized signal from a plurality of remote sites.

SUMMARY OF THE INVENTION

This need and others are substantially met through provision of the simulcast system disclosed herein. Pursuant to this invention, at least some of the remote sites are each provided with a frequency source that can be adjusted in response to signals from a system controller. The reference signal from this frequency source is used to generate both the carrier signal for that remote site and a modulation signal for use by the remote site transmitter in modulating the carrier signal. These signals, as transmitted by the remote sites, are then received by one or more monitoring sites, where the modulation signals are recovered and compared against one another. Differences between these signals reflect differences between the carrier frequencies as well, and this information is used to correct the frequency source of one or more of the remote sites.

BEST MODE FOR CARRYING OUT THE INVENTION

Figure 1:
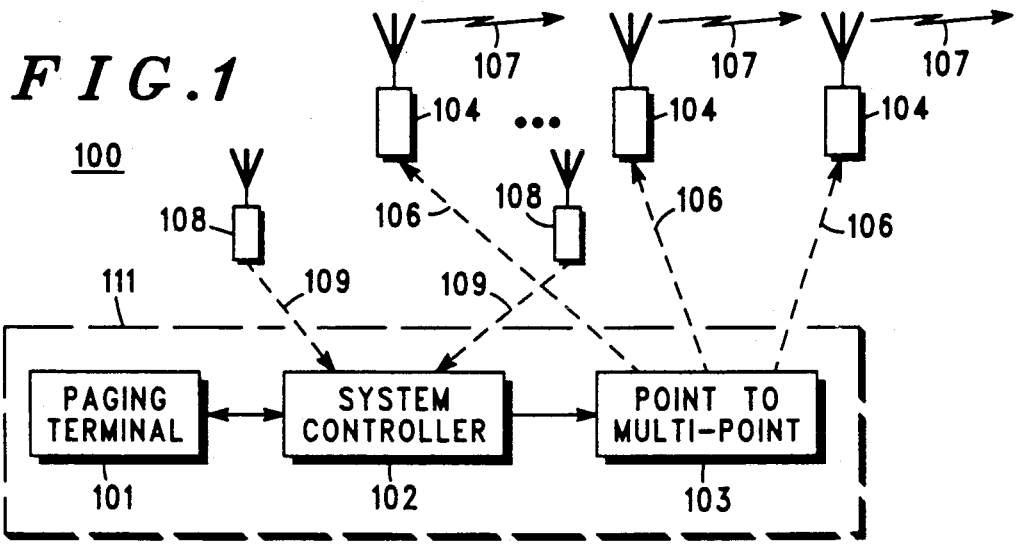
FIG. 1 comprises a block diagram depiction of a simulcast system constructed in accordance with the invention.

A simulcast system according to the invention can be seen as generally depicted in FIG. 1 by the reference numeral 100. For purposes of this description, the system will be described in conjunction with a wide area paging system; those skilled in the art will appreciate that a one-way transmission system is being used for purposes of explanation only, and that the principles of the invention are equally applicable in a two-way system.

The system includes a source site (111) and a plurality of remote sites (104). The source site (111) includes a paging terminal (101), a system controller (102), and a point-to-multipoint transmission device (103). Paging terminals are well known in the art, and hence no further description need be provided here. Point-to-multipoint transmission devices, such as microwave links and landline connections, are also well known. The particular communication link (106) selected to provide the point-to-multipoint communication services are not especially critical to the invention, so long as signal quality and propagation delay is acceptable for the application. The system controller (102) will be described below in more detail.

The various remote sites (104) function generally to receive both messages intended for rebroadcast and control signals from the source site via the communication links (106). Acting upon the control signals, the remote sites (104) then rebroadcast (107) the message information. Additional description of the remote sites will be provided below where appropriate.

Finally, the system (100) generally includes one or more monitoring stations (108). These stations function to receive the broadcast signals (107) from a number of remote sites (104). Information regarding these broadcasts, such as carrier frequency differential data, may then provided via appropriate communications link (109) to the system controller (102) for purposes described below.

Figure 2:
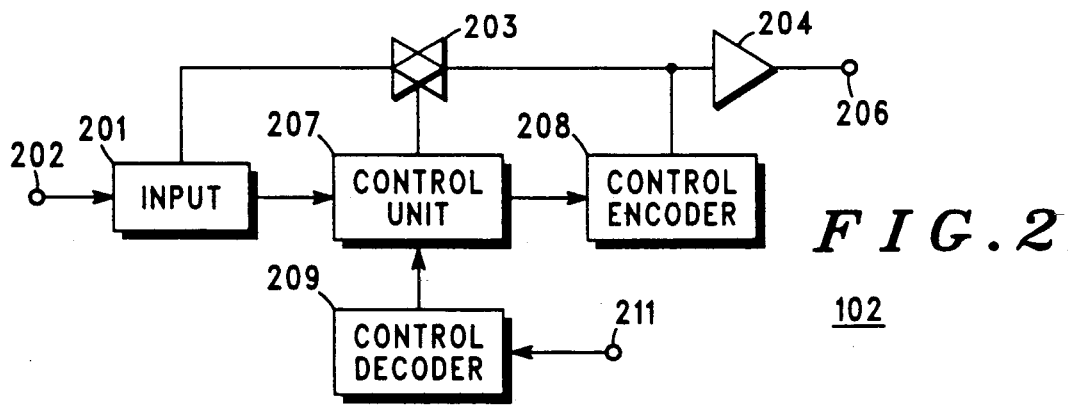
FIG. 2 comprises a block diagram depiction of a system controller constructed in accordance with the invention.

Certain details of the system controller (102) will now be described in more detail with respect to FIG. 2. Input (202) from the paging terminal (101) passes through an appropriate input unit (201), such that message information sourced by the terminal may be passed through a gate (203) to a line driver (204) that couples (206) to the point-to-multipoint transmission device (103) noted above. The gate (203) is operated by a control unit (207) that includes an appropriate processing device. The control unit (207) also develops and passes control information to a control encoder (208) that also couples to the line driver (204). So configured, the control unit (207) operates the gate (203) to effectively time multiplex the message information from the input unit (201) with the control information from the control encoder (208), all in accordance with well understood prior art technique.

The system controller (102) also includes a control decoder (209) that decodes information provided at an input (211) thereto. This input receives information from the monitoring sites (108) referenced above.

So configured, the control unit (207) controls the provision of message information to the point-to-multipoint transmission device (103), and also generates appropriate control information intended for use by the various remote sites (104). Additional details regarding the control information will be provided below where appropriate.

Figure 3:
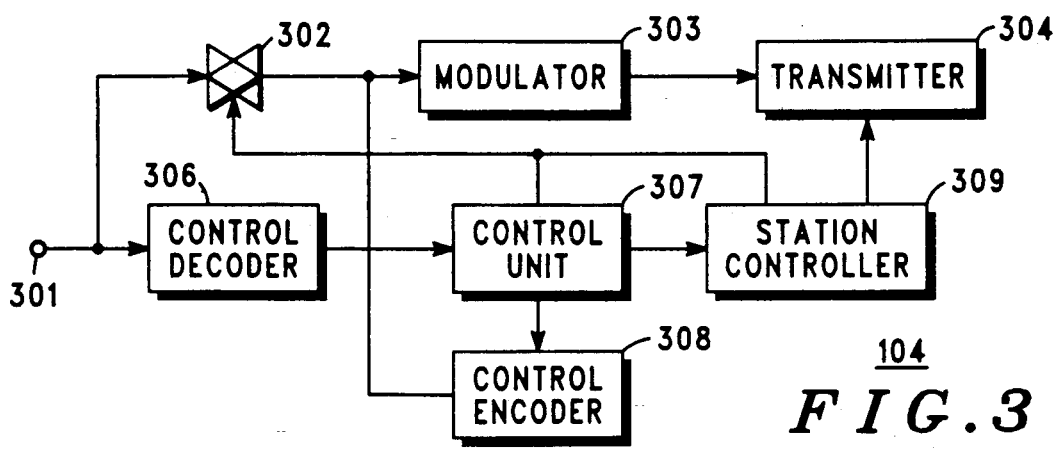
FIG. 3 comprises a block diagram depiction of a remote site constructed in accordance with the invention.

The remote sites (104), as depicted in detail in FIG. 3, include an input (301) for receiving the baseband information as provided over the appropriate communication link (106). This information is provided to a control decoder (306) that functions to decode control information provided by the system controller (102), and also through a gate (302) to a modulator (303) and associated transmitter (304). The control decoder (306) couples to a control unit (307) that generates control information that is provided to a control encoder (308), and that also provides status and control information to a station controller (309) and gate control signals to the gate (302). The gate (302) may also be controlled by the station controller (309). The station controller (309) couples to the transmitter (304) and controls various operating parameters thereof, such as the frequency of a reference source.

So configured, the control unit (307) and station controller (309) operably control the provision of message information and control information to the modulator (303) for transmission by the remote site.

Figure 4:
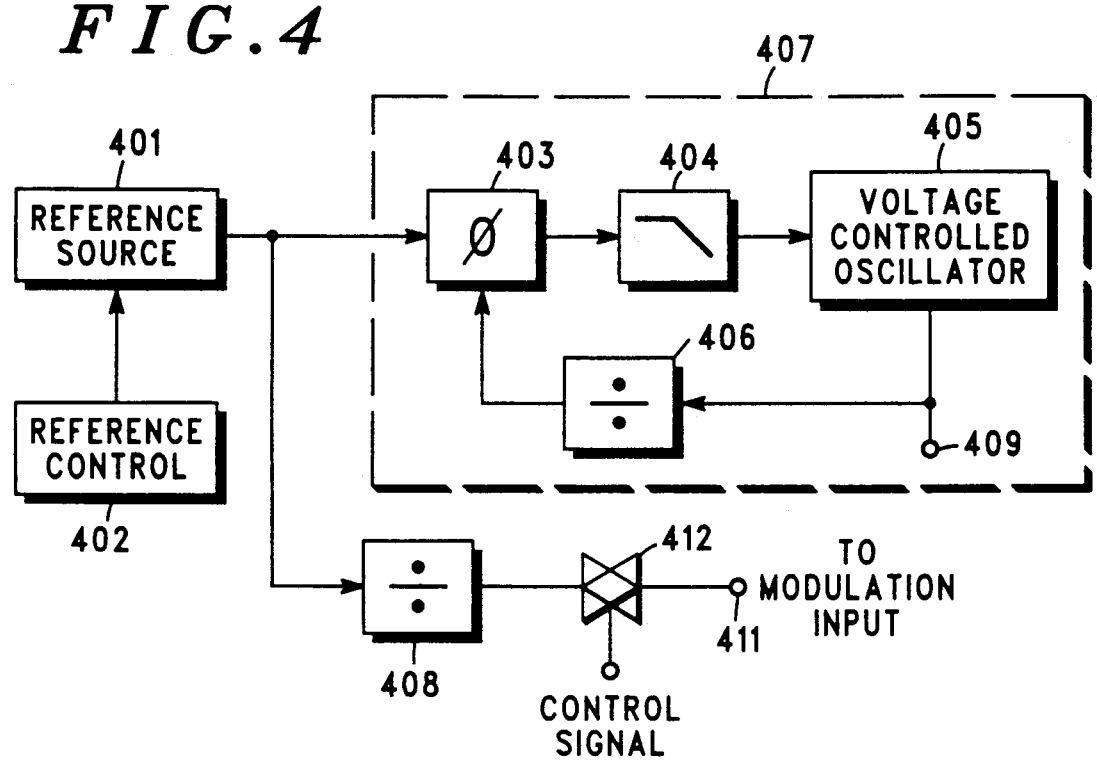
FIG. 4 comprises a block diagram depiction of a part of the remote site transmitter.

Additional detail for the transmitter (304) of the remote site (104) will now be described with reference to FIG. 4.

A reference source (401) provides a reference signal having a controlled frequency. This frequency is controlled, at least in part, by a reference control unit (402). The reference control unit (402) is responsive, in turn, to control signals sourced by the system controller (102).

A phase detector (403) receives this reference signal at one of its inputs. The phase detector (403) comprises a part of a phase lock loop (407) that includes an appropriate filter (404), VCO (405), and divider (406). So configured, the output (409) of the VCO (405) is compared (after division) with the reference source signal in known phase lock loop manner to assure a requisite relationship and stability between these two signals. The transmitter (304) utilizes this VCO output (409) as the basis for the carrier signal that will be transmitted by the remote site (104). (It should also be understood that this carrier signal constitutes the signal that should be appropriately correlated in frequency to the transmitting carrier signals of other remote sites (104) to aid in assuring the appropriate simulcast of a message signal modulated on the carrier.)

In this embodiment, a second divider (408) also receives the reference source output. The second divider (408) reduces the frequency of the reference source signal to an audible tone, which tone is then provided to the modulation input (411) for the transmitter. A gate (412) may also be provided to allow the audio tone to be selectively provided or denied to the modulation input (411) in response to a control signal.

So configured, the remote site (104) maintains a capability of transmitting a modulated signal on a carrier wherein both the modulation signal and the carrier are derived from the same reference signal.

Figure 5:
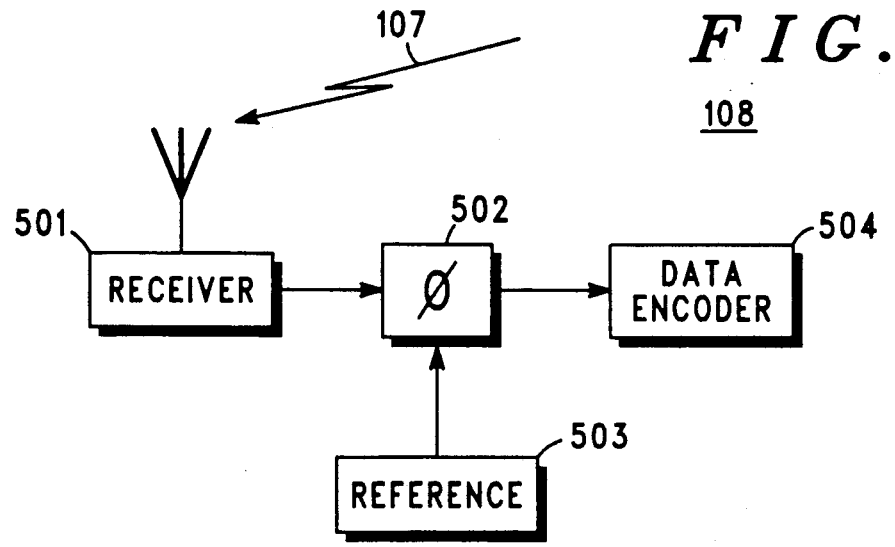
FIG. 5 comprises a block diagram depiction of a monitoring station.

Each monitoring station (108) (see FIG. 5) includes a receiver (501) for receiving the broadcasts (107) of the remote sites (104). Each monitoring station (108) should be positioned so as to be able to receive the transmissions (107) of at least two different remote sites (104).

This receiver (501) functions in a customary manner to reduce the received signal to baseband. Presuming that the broadcast signal (107) comprises the audio tone as modulated on the carrier as described above, this baseband signal will comprise the audio tone itself.

A phase detector (502) compares this audio tone against a reference signal (503). A data encoder (504) then transmits information regarding this differential to the system controller (102).

This receive, recover, and compare process can be repeated for various remote sites (104) as are capable of being received by a given monitoring station (108). Differences in audio tone frequency, as measured by the monitoring station (108), are ascertainable by the system controller (102). Since the audio tones that provide the basis for these differential comparisons are based upon the same signals that were utilized to generate the carrier signals for the stations, this measured differential is also illustrative of differences in carrier frequency between the remote sites (104). It is the latter differential, of course, that can contribute to reception difficulties in a simulcast system.

Based upon this information, the system controller (102) can readily determine an appropriate correction factor for one or more of the remote sites (104) and transmit this correction information as appropriate control signals in the same manner as other control signals are provided to the remote sites (104) using the system infrastructure. Upon reception of these control signals, the various remote sites (104) alter their reference source (401) via the reference control unit (402) to assure substantial carrier frequency similarity.

What is claimed is:

1. In a simulcast system having first and second remote means for transmitting information using a carrier frequency, a method of equalizing the carrier frequency for both the first and second remote means, comprising the steps of:

A) providing each of the first and second remote means with a frequency source;

B) generating, in each of the first and second remote means, a carrier signal and a modulation signal using the frequency source;

C) transmitting, from each of the first and second remote means, the carrier signal and the modulation signal as modulated on the carrier signal;

D) receiving, at a monitor site, the carrier signals from both of the first and second remote means;

E) recovering the modulation signals from the first and second remote means;

F) comparing the recovered modulation signal from the first remote means with a reference signal to provide a first difference signal;

G) comparing the recovered modulation signal from the second remote means with the reference signal to provide a second difference signal;

H) comparing the first difference signal with the second difference signal to provide a third difference signal;

I) adjusting the frequency source in at least one of the first and second remote means as a function, at least in part, of the third difference signal.